United States Patent
Liptak et al.

(10) Patent No.: US 12,327,214 B1
(45) Date of Patent: Jun. 10, 2025

(54) TRIGGERING A SERVICE MITIGATION ACTION BASED ON A CAUSAL-PREDICTIVE SYSTEM

(71) Applicant: Amazon Technologies, Inc., Seattle, WA (US)

(72) Inventors: Valerie Galluzzi Liptak, Mill Creek, WA (US); Sourav Kumar Agarwal, Hyderabad (IN); Tarun Bhatia, Sunnyvale, CA (US); Amber Roy Chowdhury, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 112 days.

(21) Appl. No.: 18/080,191

(22) Filed: Dec. 13, 2022

(51) Int. Cl.
*G06Q 10/0833* (2023.01)
*G06Q 10/083* (2024.01)

(52) U.S. Cl.
CPC ..... *G06Q 10/0833* (2013.01); *G06Q 10/0838* (2013.01)

(58) Field of Classification Search
CPC ............ G06Q 10/0833; G06Q 10/0838
See application file for complete search history.

(56) References Cited

U.S. PATENT DOCUMENTS

| | | | |
|---|---|---|---|
| 11,151,509 B1* | 10/2021 | Mishra | G06Q 10/08355 |
| 2014/0244167 A1* | 8/2014 | Reynolds | G01S 19/396 |
| | | | 701/518 |
| 2021/0406823 A1* | 12/2021 | Lin | G06Q 10/0833 |
| 2023/0419345 A1* | 12/2023 | Beharie | G06Q 30/01 |

* cited by examiner

*Primary Examiner* — George Chen
(74) *Attorney, Agent, or Firm* — Kilpatrick Townsend & Stockton LLP

(57) ABSTRACT

Techniques are described for predicting a future defect and triggering a mitigation action. In an example, a system generates a first input to a causal model based on geographical data associated with a location and area data associated with one or more areas that include the location, and determines a first output of the causal model. The first output indicates a first prediction of a cause of a past defect for a service associated with the location. The system also generates a second input to a predictive model based on the first input and the first output, and determines a second output of the predictive model. The second output indicates a second prediction of a future defect associated with the service. Based on the second prediction, a mitigation action can be performed such that the future defect is prevented.

20 Claims, 10 Drawing Sheets

TRIGGERING A SERVICE MITIGATION ACTION BASED ON A CAUSAL-PREDICTIVE SYSTEM

BACKGROUND

Delivery of items to locations can be facilitated with the use of location data of devices. For example, a delivery driver may operate their mobile phone to receive, from a server, delivery location data and to send, to the server, their mobile phone's location data. If the mobile phone's location and the delivery location are within a distance threshold from each other, the server can send a notification to the mobile phone informing the delivery driver that the delivery can be performed. As such, the accuracy of deliveries using location data can depend greatly on the accuracy of the location data.

BRIEF DESCRIPTION OF THE DRAWINGS

Various embodiments in accordance with the present disclosure will be described with reference to the drawings, in which.

DETAILED DESCRIPTION

Figure 1:
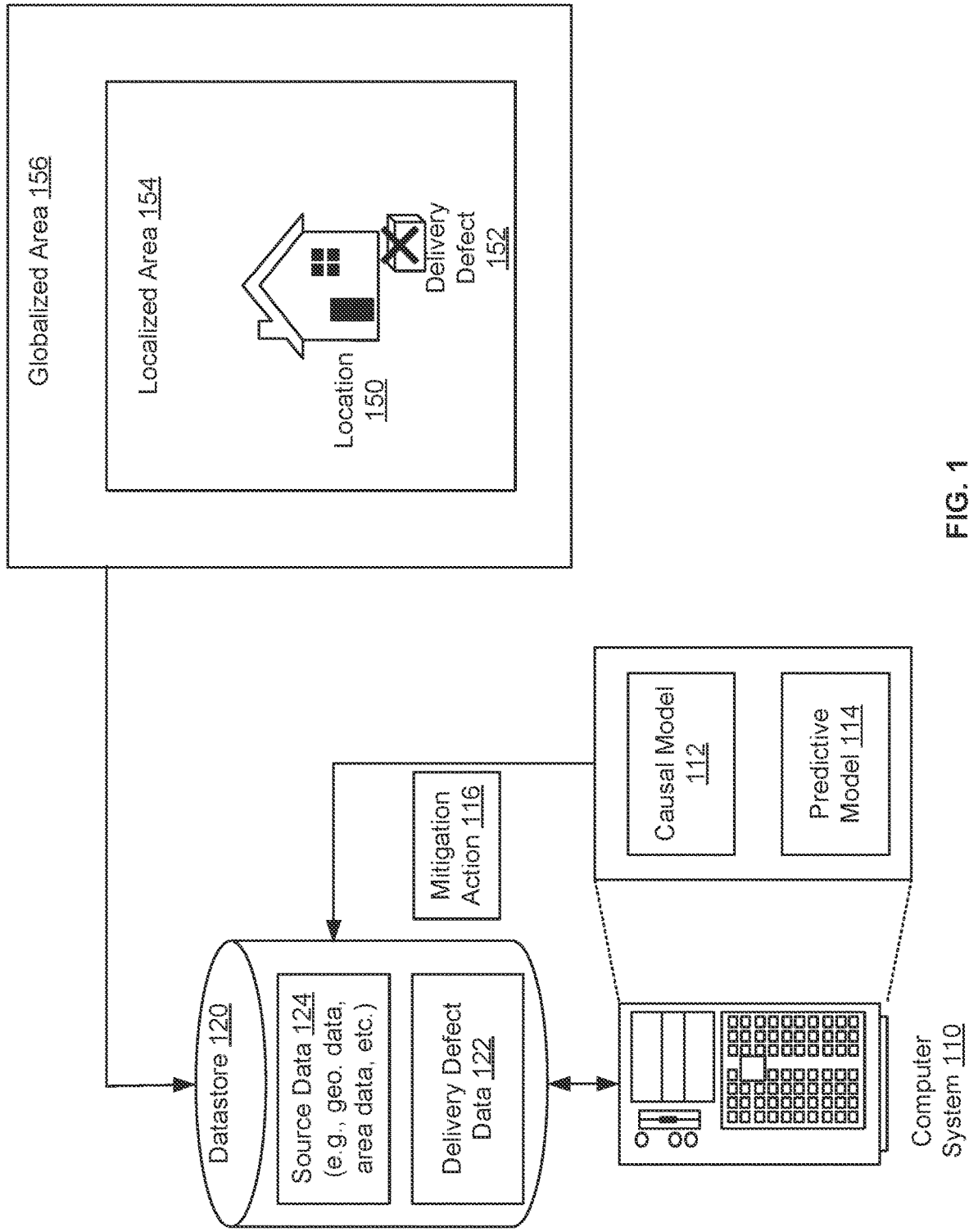
FIG. 1 illustrates an example of a system performing delivery defect prediction to trigger a mitigation action prior to a start of a delivery, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques for predicting a future defect associated with providing a service based on a causal-predictive system and triggering a mitigation action to prevent the future defect. In an example, a computer system determines that a location is associated with a past defect. Historical data related to the corresponding past service can be retrieved from a datastore and can include, for example, geographical data indicating a source of location data used for the past service and area data that includes the location. The computer system can generate a first input to a causal model based on the historical data. The output of the causal model can indicate a likely cause of the past defect. The computer system can further generate a second input to a predictive model based on the output of the causal model and the historical data. This second input can be generated prior to and independent of a future service or can include data about such a future service if already planned. The future service may be the same type of service as the past service and may be to the same or a different location. The output of the predictive model can indicate a likely future defect associated with the future service. The computer system can determine a mitigation action based on the likely future defect and can trigger performance of the mitigation action such that this defect is prevented when the future service is actually performed.

To illustrate, consider an example of an apartment unit associated with a geocode and a user account. During a past delivery that uses the geocode, delivery data can be received from a driver device associated with a driver account tasked to perform the past delivery. The delivery data can indicate completion of the delivery and location data of the driver device. User account data can also be received indicating that the past delivery was not received at the apartment unit. Thus, the computer system can determine a delivery not received (DNR) defect. Next, the computer system can determine whether a future delivery defect to the apartment unit is likely. To do so, the computer system retrieves, from a datastore, an identifier of the source of the geocode, a first embedding of features of a first area that includes the location (e.g., an area with a 1 km width from a grid reference system), and a second embedding of features of a second area that includes the first area (e.g., an area with a 10 km width from the same or a different grid reference system). The computer system generates a first input that includes the identifier, the first embedding, and the second embedding and provides this first input to the causal model. The output of the causal model indicates a prediction about a cause of the past delivery defect (e.g., this cause being the source of the geocode with a probability larger than a threshold value). The computer system then generates a second input that includes the first input, the prediction, and a distance derived from the location data of the driver device and the geocode (e.g., the distance between the driver device as indicated by its location data and the apartment unit as indicated by the geocode). The second input is provided to the predictive model that, in response, outputs a prediction that a future delivery defect (DNR or, possibly, another type of defect) may occur (e.g., a probability that this defect may occur is larger than a threshold value). Based on this prediction, the computer system can trigger a mitigation action to change the geocode (or, equivalently, to use a different geocode source for the apartment unit), for example. As such, when the next delivery is planned, a different geocode for the apartment unit is used to prevent the future delivery defect from occurring.

Embodiments of the present disclosure provide various technological advantages over a conventional computer system. For example, the conventional computer system may rely on a geocode of a location associated with a service and location data of a device associated with a service provider to send a notification to the device about the service. In particular, this system can compare the geocode and the location data to determine a distance difference. If the distance difference is smaller than a threshold value, the conventional computer system can include in the notification instructions to complete the service. A service defect can occur depending on the accuracy of the location. For example, in urban areas the location data may be inaccurate due to signal propagation and signal blockage. When the service defect occurs, a workflow may need to be executed in a reactive manner and can include performing time-consuming operations to ensure that the service is properly performed.

In contrast thereto, embodiments of the present disclosure are more robust to the inaccuracy of location data. In particular, multiple signals related to a past service can be processed to predict a likely service defect and prevent this defect from occurring in the first place. The robustness is increased due to the use of multiple signals and the mitigation action is performed in a preventative manner, rather than reactively. In addition, the signals may be sparse (e.g., a past defect rarely occurs relative to the high number of past services to the location). In this case, a purely predictive system may not accurately predict a future service defect. By also using a causal model, in addition to a predictive model, the accuracy of the prediction can be significantly improved, thereby allowing the use of the most effective and proper mitigation action. These and other improvements are further described herein below.

In the interest of clarity of explanation, embodiments of the present disclosure are described in connection with deliveries to locations. However, the embodiments are not limited as such. Instead, the embodiments similarly and equivalently apply to any other service types. A delivery is one example of a service, where a set of items can be delivered to a location. Generally, a service to a location can include a set of operations that may be performed in route to and/or from the location, when nearby the location, and/or at the location. For example, a pick up can be a service, whereby a set of items may be picked up or removed from the location. An item assembly is another example of a service, whereby an item can be assembled at the location. Regardless of the type of a service, the service is associated with a location. The embodiments of the present disclosure can be used to determine a past defect associated with that same location and/or a different location and with the type of service that was provided, determine a cause of the past defect using a causal model, and make a prediction for a future defect associated with providing the service based at least in part on the cause.

FIG. 1 illustrates an example of a system performing delivery defect prediction to trigger a mitigation action prior to a start of a delivery, according to embodiments of the present disclosure. As illustrated, the system can include a computer system 110 and a datastore 120. The computer system 110 can store program code (e.g., as instructions in one or more memory of the computer system 110) for a causal model 112 and a predictive model 114. This program code can be executed (e.g., by one or more processors of the computer system 110) to generate predictions about future delivery defects and trigger mitigation actions. The datastore 120 can store data usable by the computer system 110 to at least generate the predictions.

In an example, the computer system 110 can include hardware and/or virtualized components executing on hardware. Such hardware can include one or more processors and one or more memory. For instance, the computer system 110 can be a set of physical servers and/or a combination of virtualized servers on hardware. The datastore 110 can include data storage that stores data according to one or more data storage technologies. For example, the datastore 110 supports one or more databases storing the data.

In the illustration of FIG. 1, a location 150 can be associated with a user account. For example, the location 150 can be an apartment unit, a house, a physical mailbox, a post office (P.O.) box, or any other physical location to which an item can be delivered. The user account can store data indicating an address of the location 150. User account data representing the user account can be stored in the datastore 120.

A past delivery defect 152 may be associated with the user account. For instance, data about the past delivery defect 152, such as its type and timing, can be included in the user account. Different types of delivery defects are possible, such as delivery not received defects, delivery to incorrect location defects, incomplete delivery due to unlocated location defects, and incomplete delivery due to inaccessible location defects, among others. In an example, the user account data indicates that a past delivery was requested but was not completed. This data indicates a delivery not received defect. In another example, the user account data indicates that a delivery was received when no delivery was requested. This data indicates a delivery to incorrect location defect. In yet another example, the user account data can indicate that a transporter (e.g., a driver using a delivery vehicle, a biker using a bicycle, a walker, an unmanned aerial vehicle, a ground-based movable robot, etc.) unsuccessfully attempted to find the location 150 for a delivery. This data indicates an incomplete delivery due to an unlocated location defect. In another example, the user account data can indicate that a transporter found but unsuccessfully attempted to access the location 150 for a delivery (e.g, the location 150 is within a secured area to which the transporter did not have access). This data indicates an incomplete delivery due to an inaccessible location defect.

The datastore 120 can store delivery defect data 122 indicating the past delivery defect 152 associated with the location 150 and, similarly, any other delivery defect associated with the same location 150 or any other location. The delivery defect data 122 can be stored separately from user account data (e.g., in a different database) or part as user account data associated with multiple locations. In both examples, for the past delivery defect 152 (and similarly for any other past delivery defect) the delivery defect data 122 includes and associates an identifier of the location 150 and data about the past delivery defect 152 (e.g., its type, timing, etc.).

When the past delivery to the location 150 was performed (resulting in the past delivery defect 152), planning data to perform the past delivery was used. This planning data can include geographical data of the location 150 (e.g., a geocode available from a geocode source), data about the transporter (e.g., account data, type of transporter, etc.), user account data (e.g., user preferences for item deliveries), etc. Contextual data about the past delivery can also be collected, such as environmental data (e.g., as time of day), weather data, first area about a localized area 154 that includes the location 150, second area data about a globalized area 156 that includes the localized area 154, and other contextual data. The datastore 120 can store the planning data and the contextual data as part of source data 124. The source data 124 can be maintained for past deliveries (successful or defective) over a time window (e.g., the last six months).

In an example, the localized area 154 can be an area having a certain radius or size, whereas the globalized area 156 can be an area with a much larger radius or size. The area data about the localized area 154 can indicate features of the smaller area that may be relatively more specific or applicable to the location 150. These features can include, for instance, frequency of deliveries and/or frequency of delivery defects in the localized area 154, density of delivery locations, etc. In comparison, the area data about the globalized area 156 can indicate features of the larger area that is relatively more global for the location 150 than localized area 154. These features can indicate, for example, whether the location 150 is an in urban area or a rural area.

In an example, the localized area 154 is an area with a first width from a grid reference system (e.g, a 1 km width of a grid from a military grid reference system (MGRS). In comparison, the globalized area 156 is an area with a second, larger width from the grid reference system (e.g, a 10 km width of a grid from the MGRS). The area data of each one of the localized area 154 and the globalized area 156 can include one or more embeddings of the features of the corresponding area.

The computer system 110 can access the datastore 120 (e.g., by submitting queries and receiving query results) to determine that the location 150 is associated with the past delivery defect 152 (e.g., based on a look-up of the delivery defect data 122). Due to the past delivery defect 152, the computer system 120 can retrieve data from the source data 124 specific to the location 150. This data can include any or a combination of the geographical data (including the geocode and/or an identifier of the geocode source), area data (e.g., including embeddings of the localized area 154 and/or globalized area 156), and contextual data (e.g., including embeddings of transporter account data, user account data, etc.). The computer system 110 can generate a first input to the cause model based on the retrieved data. For example, the first input includes the retrieved data. The computer system 110 can also execute the program code of the causal model 112, whereby the execution uses the first input to generate a first output of the causal model 112. The computer system 110 can then generate a second input based on the first input and the first output. For example, the second input includes a portion of, or the entire first input and a portion of, or the entire first output. The computer system 110 can also execute the program code of the predictive model 114, whereby the execution uses the second input to generate a second output of the predictive model 114. The second output can include a prediction about a future delivery defect.

This prediction is generated prior to a start of a future delivery to the location 150. In fact, this prediction can be performed offline prior to and/or independent of a request for the future delivery (e.g., even before an item is ordered and its delivery to the location 150 is requested). The computer system 110 can output a mitigation action 116 to reduce or eliminate the risk of the future delivery defect.

As shown in the arrow back to the datastore 120, the mitigation action 116 can include changing planning data in the source data 124, where the planning data is associated with the location 150. For example, the change can indicate that a different geocode source should be used, that a particular delivery transporter profile or capability is needed, that a future delivery is to occur during a particular time of day, etc. The change can be reflected in the source data 124, whereby another prediction can be generated by the predictive model 114 by generating a new input thereto indicating the change. As needed, and iteratively, different changes can be made until the predictive model 114 outputs a prediction that the future delivery defect is unlikely to occur (e.g., its likelihood is smaller than a likelihood threshold).

Subsequently, data can be received from a user device (e.g., a device associated with the user account) requesting a delivery to the location 150. The latest planning data from the source data 124 can be used to plan for the delivery. Accordingly, the risk of the future delivery defect to occur in association with this delivery is reduced or even eliminated.

Figure 2:
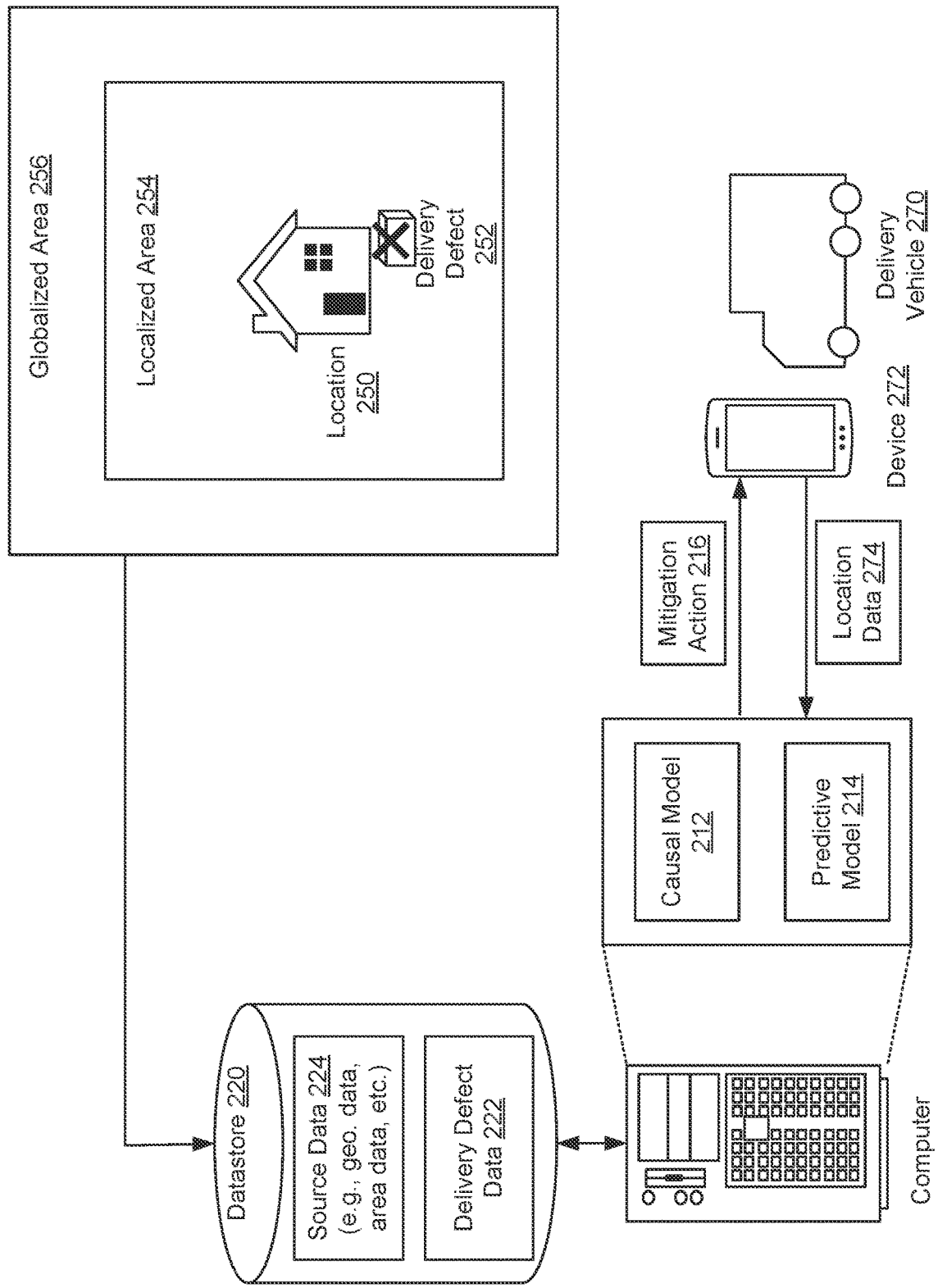
FIG. 2 illustrates an example of a system performing delivery defect prediction to trigger a mitigation action after a start of a delivery, according to embodiments of the present disclosure.

FIG. 2 illustrates an example of a system performing delivery defect prediction to trigger a mitigation action after a start of a delivery, according to embodiments of the present disclosure. As illustrated, the system can include a computer system 210 and a datastore 220, which can be examples of the computer system 110 and the data store 120, respectively, of FIG. 1. The computer system stores program code for a causal model 212 and a predictive model 214, which can be examples of the causal model 112 and the predictive model 114, respectively of FIG. 1. The datastore 220 stores delivery defect data 222 and source data 224, which can be examples of the delivery defect data 122 and the source data 124, respectively, of FIG. 1. A location 250 can be within a localized area 254 that is included in a globalized area 256. The location 250 may be associated with a past delivery defect 252. The location 250, the past delivery defect 252, the localized area 254, and the globalized area 256 can be examples of the location 150, the past delivery defect 152, the localized area 154, and the globalized area 156, respectively, of FIG. 1.

Here, rather than or in addition to generating a prediction about a future delivery defect and triggering a mitigation action prior to and/or independent of a next delivery to the location 250 (as in FIG. 1), the computer system 210 can generate a prediction about a future defect and trigger a mitigation action upon a start and prior to an end of a delivery to the location 250. In one example, the computer system can generate a first input to the first causal model 212 based on the delivery defect data 222 and the source data 224. This first input can be generated prior to the start of the delivery or after the start but before the end of the delivery. Based on this input, the computer system 210 can determine a first output of the causal model 212 that indicates a likely cause of the past delivery defect 252. Here also, the first output can be generated prior to the start of the delivery or after the start but before the end of the delivery.

Furthermore, upon the planning of the delivery (e.g., planning data is generated, possibly stored in the datastore 220 as part of the source data 224, and indicates the timing of the delivery, transporter account data of the transporter assigned the delivery, a type of a delivery vehicle 270 to be used for the delivery, etc.), the computer system 210 can generate a second input to the predictive model 214 based on the first output of the causal model 214 and the planning data. In addition, upon a start of the delivery, the computer system 212 can receive location data 274 of a device 272 associated with the delivery vehicle 270. This device 272 can be integrated with the delivery vehicle 270 and/or can be a mobile device operated by a transporter. The location data 274 indicates a location (e.g., using global positioning system (GPS) coordinates) of the device 272 (or, equivalently, of the item to be delivered to the location 250). The second input to the predictive model 214 can also be based on the location data 274 (e.g., can include the location data 274 and/or a distance derived from the geocode of the location 250 and the location data 274). The output of the predictive model 214 indicates a prediction of a future delivery defect for the current delivery.

In case the prediction indicates that the likelihood of the future delivery defect exceeds a threshold value, the computer system 210 can trigger a mitigation action 216 that may be performed prior to the completion of the delivery. For example, the computer system can send notification data to the device 270. This notification data instructs the delivery vehicle 270 (e.g., when the device 272 is integrated with the delivery vehicle 270, such as when the delivery vehicle is a robot) to execute the mitigation action 216. Alternatively, or additionally, the notification data informs the transporter (e.g., by being presented on a user interface of the device 272) about the mitigation action 216. The mitigation action 216 can use a different geocode of the location 250 or a distance measurement to reduce the distance between the device 272 and the location 250, can include retrieving and displaying information (e.g., an image of the location 250), and/or performing another set of operations to reduce the risk of the defect.

Referring back to FIGS. 1 and 2, these figures illustrate generating a prediction of a future delivery defect for a future (or currently ongoing) delivery to a location based on a past delivery defect associated with that same location. This corresponds to avoiding a recurring defect. However, the embodiments of the present disclosure are not limited as such. For example, the prediction can be associated with a location for which no past delivery defect exists or for which no past delivery has been performed. In this case, the input to the causal model may, but need not, include the geographical data of the location and may, but need not, include data about another location within a localized area for which a past delivery defect was detected.

Figure 3:
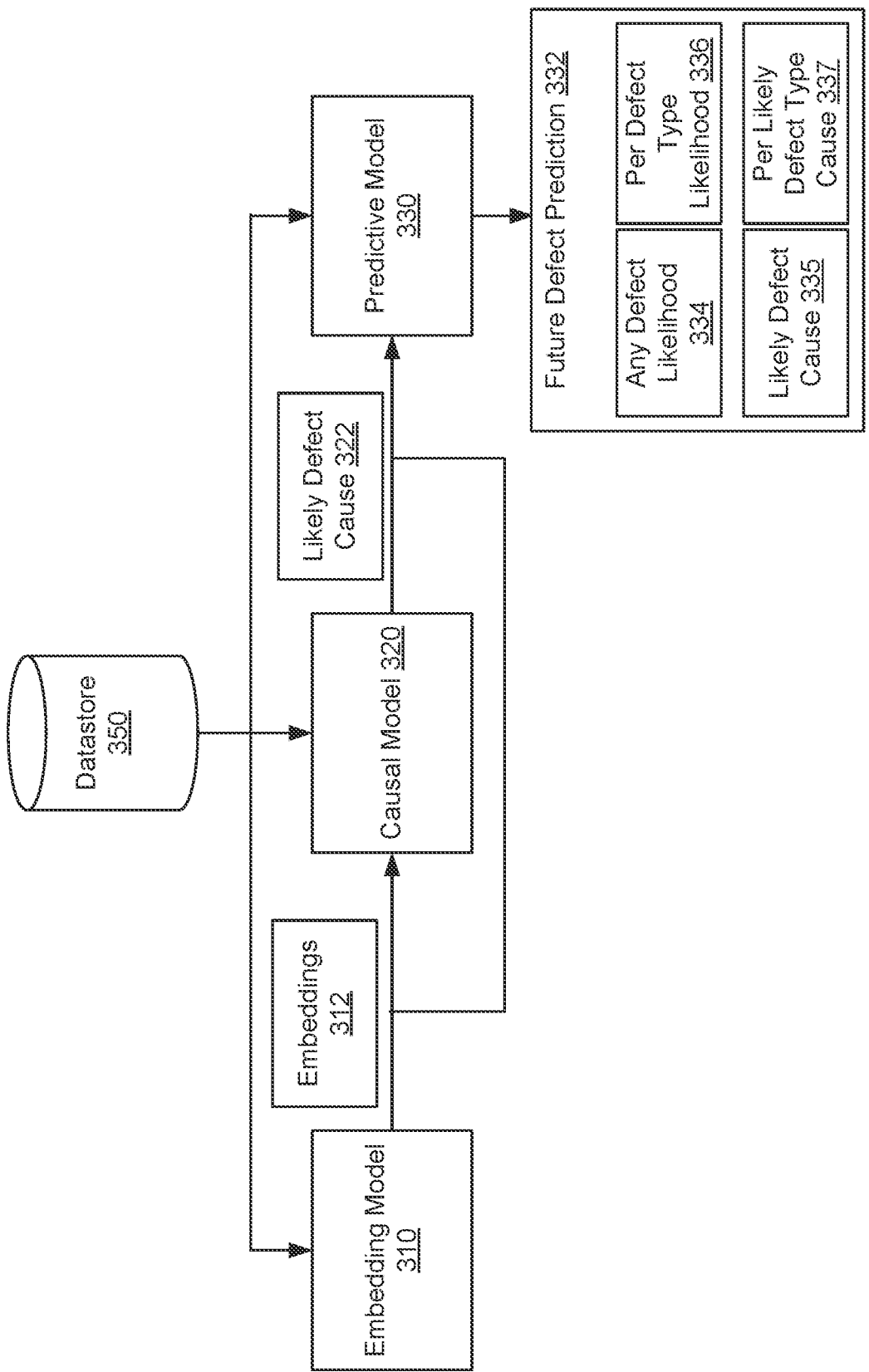
FIG. 3 illustrates an example of a causal-predictive system, according to embodiments of the present disclosure.

FIG. 3 illustrates an example of a causal-predictive system, according to embodiments of the present disclosure. The causal-predictive system stores program code of an embedding model 310, a causal model 320 (which can be an example of the causal model 112 of FIG. 1), and a predictive model 330 (which can be an example of the predictive model 114 of FIG. 1). The embedding model 310 can generate embeddings 312 from data stored in a datastore 350 (which can be an example of the data 120 of FIG. 1). The embeddings 312 can be included in a first input to the causal model 320 and a second input to the predictive model 330. The first input can also include data from the datastore 350, whereas the second input can include data from the datastore 350 and data from a first output of the causal model 320. For a past delivery that is associated with a past delivery defect, the first output can indicate a likely defect cause 322 (e.g., a likelihood of a particular cause of the defect, or a likelihood distribution of possible causes of the defect). The predictive model 330 can generate a second output that indicates a future defect prediction 332 for a delivery that has not started yet (as in FIG. 1) or for an ongoing delivery that has not been completed yet (as in FIG. 2).

In an example, the embedding model 310 is implemented as an artificial neural network (e.g., a convolutional neural network) that generates embedding vectors. For example, the embedding model 310 can be a trained encoder and/or a trained transformer. Each embedding 312 can be an embedding vector that encodes and/or transforms data from the datastore 350. These embeddings 312 can encode and/or transform geographical data, area data (including features of a localized area, features of a globalized area, and other geographical data such as an address identifier specific to a location, a place identifier specific to multiple addresses, etc.), transporter account data (e.g., transporter profile, associated type of delivery vehicle and other delivery vehicle information, etc.), user account data (e.g., user preferences, user delivery history, user order history, user addresses, etc.), contextual data, planning data, and the like.

One of the challenges with modeling defects is that they are infrequent events, which leads to sparse data. In any given area, there may only be one or two locations with defects to learn from. In addition, locations with fewer deliveries are more likely to have a defect, but less likely to have a long history of defects to learn from. There is an advantage to take learnings from a dense source of data (e.g., all deliveries or addresses) and transfer them for use in the defect modeling space.

To do so, in an example, geospatial embeddings are learned. For instance, embeddings of 10 km and 1 km MGRS grids are used. The embeddings are used by using the proximity of addresses within the MGRS grid cell to form the basis of positive or negative matches.

The embeddings 312 are used in both the causal model 320 and the predictive model 330 to inform each of these two models 320 and 330 about the type of area that a location is in. This can be beneficial for delivery not received defects as they may also result from package theft rather than solely from delivery to an incorrect location. Other types of defects may also be influenced by the type of area (e.g., rural properties may have larger distance between a delivery device and a destined location than urban or suburban areas).

The embedding model 310 can be trained using different techniques. In one example technique, a list of addresses that were delivered to during a time period (e.g., one day) of deliveries in a relevant region is used. The address as well as associated information such as the vended geocode, source, and MGRS string for the vended geocode location are available. A certain percentage of these addresses (e.g., 10%) can be sampled to generate a set of addresses. The training data can include the following: low similarity data, the set of addresses matched randomly with other addresses of the list, high similarity data, one address for each 1 km MGRS in the set and one address for each 100 m MGRS in the same in the same 10 km MGRS matched randomly, the set matched with itself, and the set matched randomly with other addresses with the same place identifier. The matches are counted as "similar" if two addresses are within 1 km of each other and dissimilar otherwise. This technique is intended to create a set of addresses that is balanced with regard to addresses having similarity vs addresses having dissimilarity. A first model (e.g., an Object2Vec Algorithm) is trained using the 1 km MGRS and a separate model for the 10 km MGRS is trained to get embeddings of each object of a certain width (e.g, eight, or another width, selected after a hyperparameter search showed only minimal improvements of having larger embedding widths such as thirty-two).

As further described in the next figures, the causal model can be implemented as a probabilistic graphical model (PGM). The PGM can be trained using historical defect data stored in the datastore 350. In comparison, the predictive model 330 can be a machine learning model. Because the predictive model 330 can be used in-real time (e.g., while a delivery is ongoing), it can be implemented as a low complexity machine learning model with low processing latency such as an XGBoost model (or some other regression model).

The future defect prediction 332 can indicate different types of predicted data. In an example, the future defect prediction 332 includes a likelihood 334 of any type of defect predicted to occur. This likelihood 334 can be compared to a threshold value. Is larger than the threshold value, a flag can be set that a future delivery defect is predicted. Otherwise, no future delivery defect is predicted.

In another example, the future defect prediction 332 includes a likely defect cause 335 of a predicted future delivery defect. This likely defect cause 335 can identify a cause from predefined causes (e.g., geocode source, area data, transporter account data, user account data, environmental data, etc.) and a likelihood of this cause as being the reason for the predicted future delivery defect.

In yet another example, the future defect prediction 332 includes a likelihood 336 per type of defect that may occur. For example, if there are "K" number of predefined classes of defects, the future defect prediction 332 indicates "K" likelihoods, each corresponding to one of the "K" classes, such that the future defect prediction 332 represents a likelihood distribution over "K" elements.

In another example, the future defect prediction 332 includes a likely defect cause 337 per type of defect that may occur. For example, for each one of the "K" predefined classes of the defect, the future defect prediction 332 can identify a cause from "M" predefined causes (e.g., geocode source, area data, transporter account data, user account data, environmental data, etc.) and a likelihood of this cause as being the reason for the predicted type of the future delivery defect.

The predictive model 330 can also be trained using outputs of the causal model 320 (where these outputs are generated from the historical data) and embeddings of some of the historical data. To train for the likelihood 334 or 336, the training data can be labeled based on a delivery defect frequency. To train for the causes 335 or 337, the training data can be further labeled based on the frequency of causes as indicated by the outputs of the causal model 320.

Although not illustrated in FIG. 3, the second output of the predictive model 330 can also indicate a mitigation action. For example, this output itself can describe the mitigation action. Here also, the training data can include, for a past delivery defect, a label indicating a proper mitigation action to perform. Alternatively, a mapping between mitigation actions and delivery defect likelihoods (for any defect or per type of defect) and/or likely causes (for any defect or per type of defect) can be pre-defined and stored (e.g., in the datastore 350). In this case, the second output of the predictive model 330 is used to look up the mapping and determine one or more mitigation actions to be triggered. Further, a mapping between mitigation actions and likely causes of past delivery detects (e.g., possible outputs of the causal model 320) can be pre-defined and stored (e.g., in the datastore 350). In this case, the first output of the causal model 320 is used to look up the mapping and determine one or more mitigation actions to be triggered.

Figure 4:
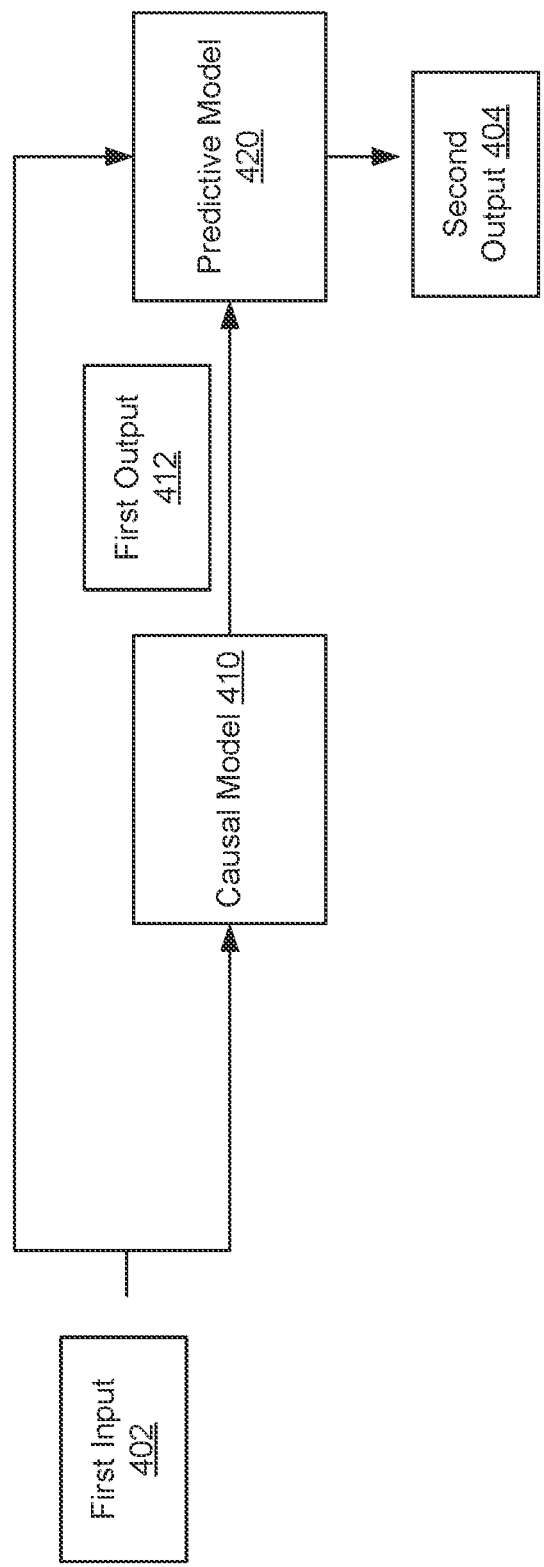
FIG. 4 illustrates an example of inputs and outputs of a causal model and a predictive model, according to embodiments of the present disclosure.

FIG. 4 illustrates an example of inputs and outputs of a causal model 410 and a predictive model 420, according to embodiments of the present disclosure. The causal model 410 and the predictive model 420 can be examples of the causal model 320 and the predictive model 330, respectively, of FIG. 3. As illustrated, a computer system (e.g., the computer system 110 of FIG. 1) generates a first input 402 to the causal model 410 and, in response, determines a first output 412 of the causal model 420. Some or all of this first input 402 and some or all of the first output 402 can be used as part of a second input to the predictive model 420 that then generates a second output 404.

In an example, the first input 402 is based on historical delivery data. In particular, for a location associated with one or more past delivery defects, the first input can include geographical data (e.g., an identifier of a source of the geocode used for the past delivery), area embeddings, transporter account embeddings, user account embeddings, and the like. The first output 412 indicates a first prediction of a cause(s) of the past delivery defect(s). For a cause, this prediction can include a likelihood that the cause is the reason for the past delivery defect, where this likelihood can be compared to a threshold value. If larger than the threshold value, the cause can be declared as the reason. Alternatively, or additionally, the prediction can include, for a cause, a likelihood distribution indicating, for each possible cause from a predefined set of causes, a corresponding likelihood.

In an example, the second input can include the first input 402 and the first output 412. The second input can also include additional historical data and/or planning data and/or contextual data for a next planned delivery. The second output 404 can indicate a future defect prediction, similar to the future defect prediction 332 of FIG. 3.

Figure 5:
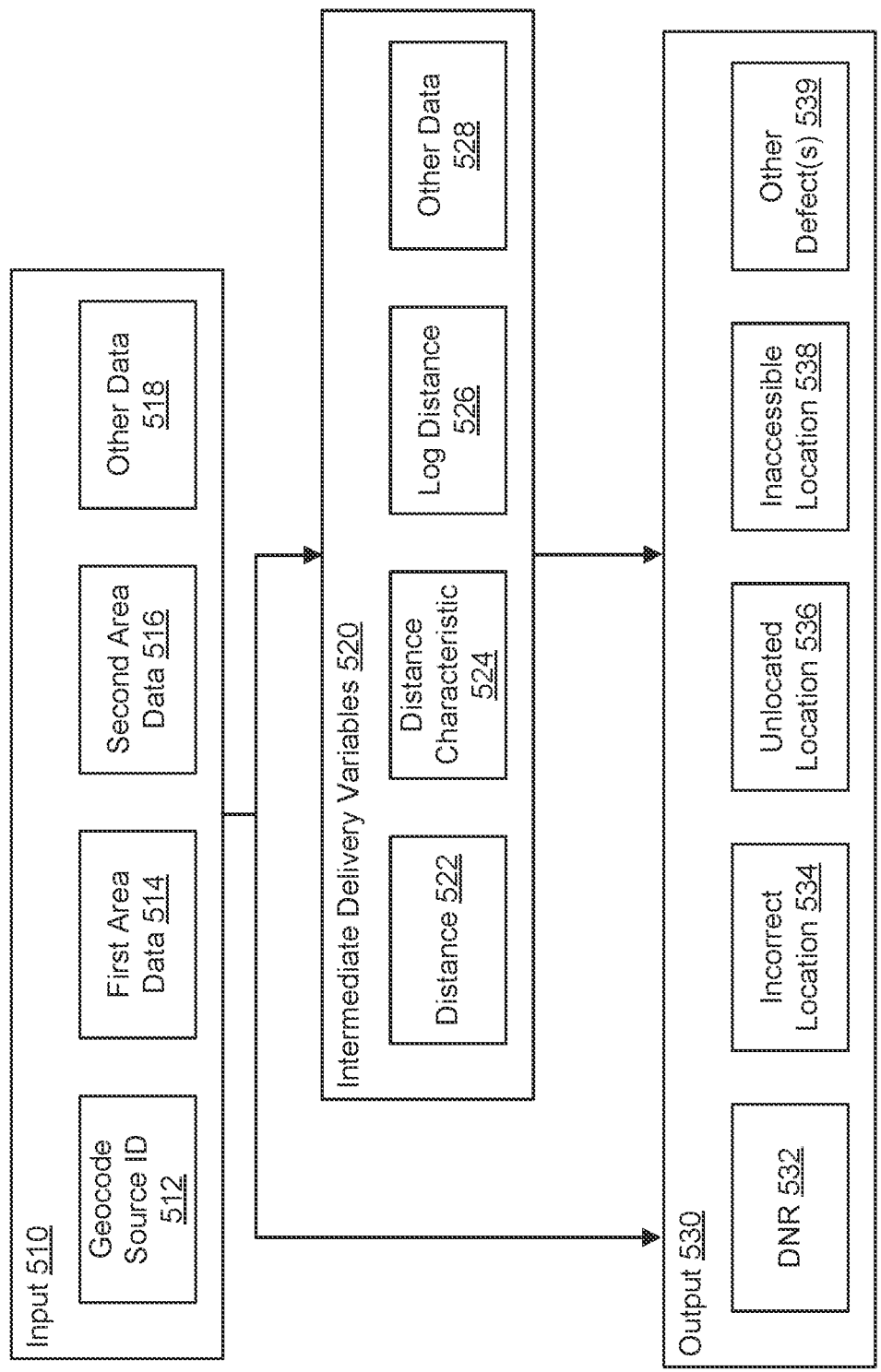
FIG. 5 illustrates an example of a causal model, according to embodiments of the present disclosure.

FIG. 5 illustrates an example of a causal model, according to embodiments of the present disclosure. The causal model can be implemented as a PGM. Generally, based on historical data collected about past deliveries and past delivery defects to multiple locations (e.g., which a region), the causal model is trained to encode complex joint multivariate probability distributions using a graph and capture conditional independence relationships between interacting random variables. Once trained, an input 510 specific to a location associated with a past delivery can be provided to the causal model that then generates an output 530 about a likely cause for the past delivery defect.

In an example, the causal model has graph-based structure. The input includes multiple variables that corresponds to a first level of the graph-based structure. A number of intermediate levels can exist (although FIG. 5 illustrates a single intermediate level), whereby each level includes variables and the variables within a level and across levels can be interconnected. An output level can include variables, each representing a possible delivery defect cause, where these variables can be interconnected among each other and to variables from one or more preceding levels (including from the first level). The connections between the variables can reflect the probability distributions and the conditional independence relationships. In an example, the variables can be predefined prior to the training, where the training learns the connections. In another example, the variable may not be predefined (or at least not all of them are predefined), and the training can learn the variables in addition to the connections.

FIG. 5 illustrates a simplified representation of an example graph-based structure. The input 510 includes a geocode source identifier 512 (which can correspond to one input variable from among input variables corresponding to different geocode sources), first area data 514 (which can be a variable(s) for a first embedding(s) of a localized area), second area data 516 (which can be a variable(s) for a second embedding(s) of a globalized area), and other data 518 (which can be a set of variables for other possible types of inputs, such as address embeddings, transporter account embeddings, user account embeddings, contextual data embeddings (including time of day features), etc.). At an intermediate level, different intermediate delivery variables 520 may be used. These variables include a distance 522, a distance characteristic 524 (e.g., whether the distance is larger than a threshold value or not), a logarithmic value 526 of the distance 522, and other data 528 (type of location, type of access to location, type of parking by location, etc.)). The output 530 can include variables for the different types of defects such as delivery not received 532, delivery to incorrect location 534, incomplete delivery due to unlocated location 536, incomplete delivery due to inaccessible location 538, and other possible defects(s) 539.

For a specific location with a past delivery defect, the geocode source identifier 512 identifies the source of the geocode used for the past delivery. The first area data 514 and the second area 516 correspond to embeddings of localized and globalized areas that include the location. The other data 518 can relate to contextual data and/or other planning data related to the past delivery. The distance 522 can be the distance between the geocode and the location of a delivery device associated with a transporter account tasked to perform the past delivery. The output 530 can indicate the likelihoods for each possible cause 532-539 and, the cause having the highest likelihood can be declared to be the likely cause for the past delivery defect.

In an example, the causal model is used to learn about previous defects and estimate the probability of them happening again. In particular, a causal graph is generated which shows the causal dependencies between features, and then is train using defect data from a region of interest. Fitting is used with data from the past deliveries in the dataset. All defects from the dataset are used and a small portion of the successful deliveries (e.g., 0.5% or some other percentage) are used to give the model a defect rich dataset to learn from. The training can use one or more causality libraries such as DoWhy and/or PyWhy causality libraries that allow computing the impact of proposed interventions and/or attributing root causes to a given outlier. Given the dataset, the causality library (ies) is (are) used to select models for each variable in the graph and train the PGM. In an example of analyzing the impact of a geocode source, counterfactual of changing the geocode source is simulated. The probability of a defect occurring is then found.

Once the causal model is trained, inferences can be generated. For example, root cause analysis can be performed to determine a root cause behind a given defect. The probability of the defect can be estimated given a counterfactual situation (e.g., by setting the given values in the graph and seeing what the downstream estimates are). Counterfactual simulation can be used to produce the causal features used in a predictive model.

Figure 6:
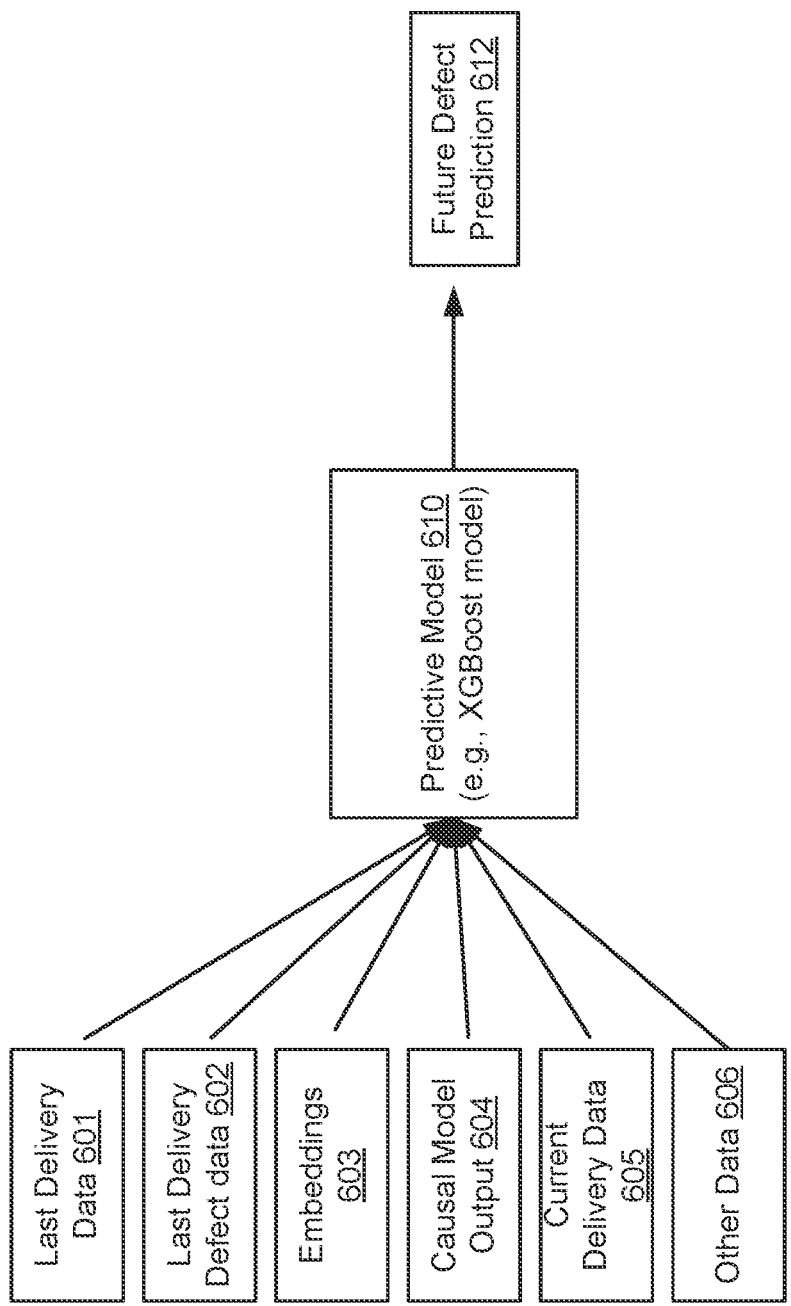
FIG. 6 illustrates an example of a predictive model, according to embodiments of the present disclosure.

FIG. 6 illustrates an example of a predictive model 610, according to embodiments of the present disclosure. The predictive model 610 can be implemented as a machine learning model, such as an XGBoost model, trained using historical data about past deliveries (e.g., both successful and with delivery defects, over a period of time such as one day) to predict with a possible defect or a possibility per type of defect.

Once trained, the predictive model 610 can be used for inference for a specific location. As illustrated in FIG. 6, the input to the predictive model 610 can include any or a combination of last delivery data 601, last delivery defect data 602, embeddings 603, causal model output 604, current delivery data 605, and/or other data 606. The last delivery data 601 (portions of which can be part of the input to a causal model) includes, for example, the geocode source identifier and the distance between the delivery device and the location during the last delivery. This data can also indicate other past deliveries indicated as concurrently completed with the past delivery based on data from the delivery device. The last delivery defect data 602 can indicate the type of the past delivery defect(s). The embeddings 603 can be area embeddings (which can also be part of the input to the causal model). The causal model output 604 indicates the prediction of the causal model about the past delivery defect. The current delivery data 605 can include embeddings about contextual data (e.g., including address embeddings, weather embeddings) and/or planning data associated with the next delivery (e.g., including transporter account data embeddings of a transporter account assigned to the next delivery, time of day embeddings, etc.). The other data 606 can include embeddings for other historical data, such as transporter account data embeddings for a transporter account assigned to the past delivery (e.g., including transporter experience in general and transporter experience in an area that includes the location). The output of the predictive model 610 include a future defect prediction 612, similar to that of FIG. 3.

Figure 7:
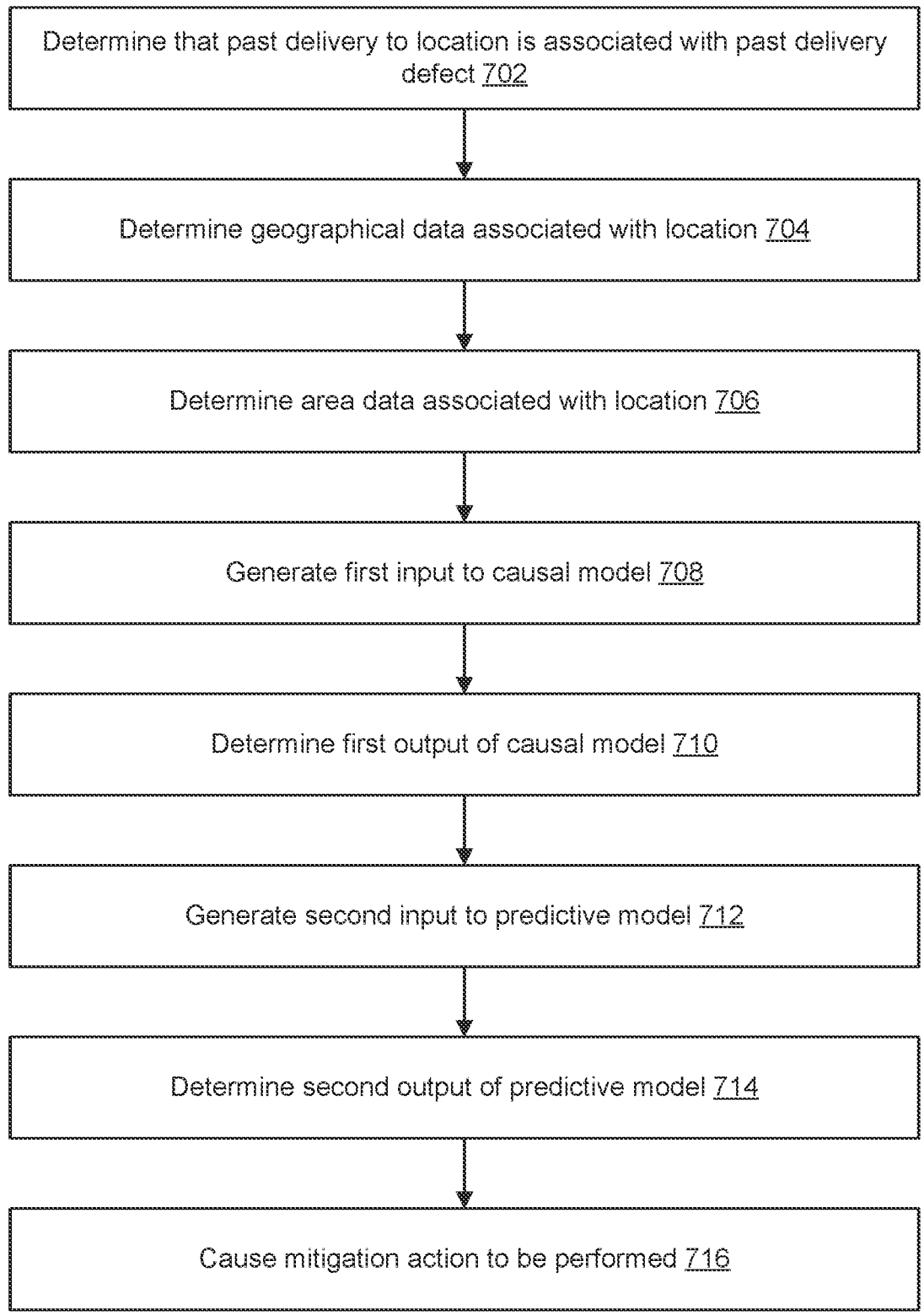
FIG. 7 illustrates an example of a flow for performing delivery defect prediction, according to embodiments of the present disclosure.
Figure 8:
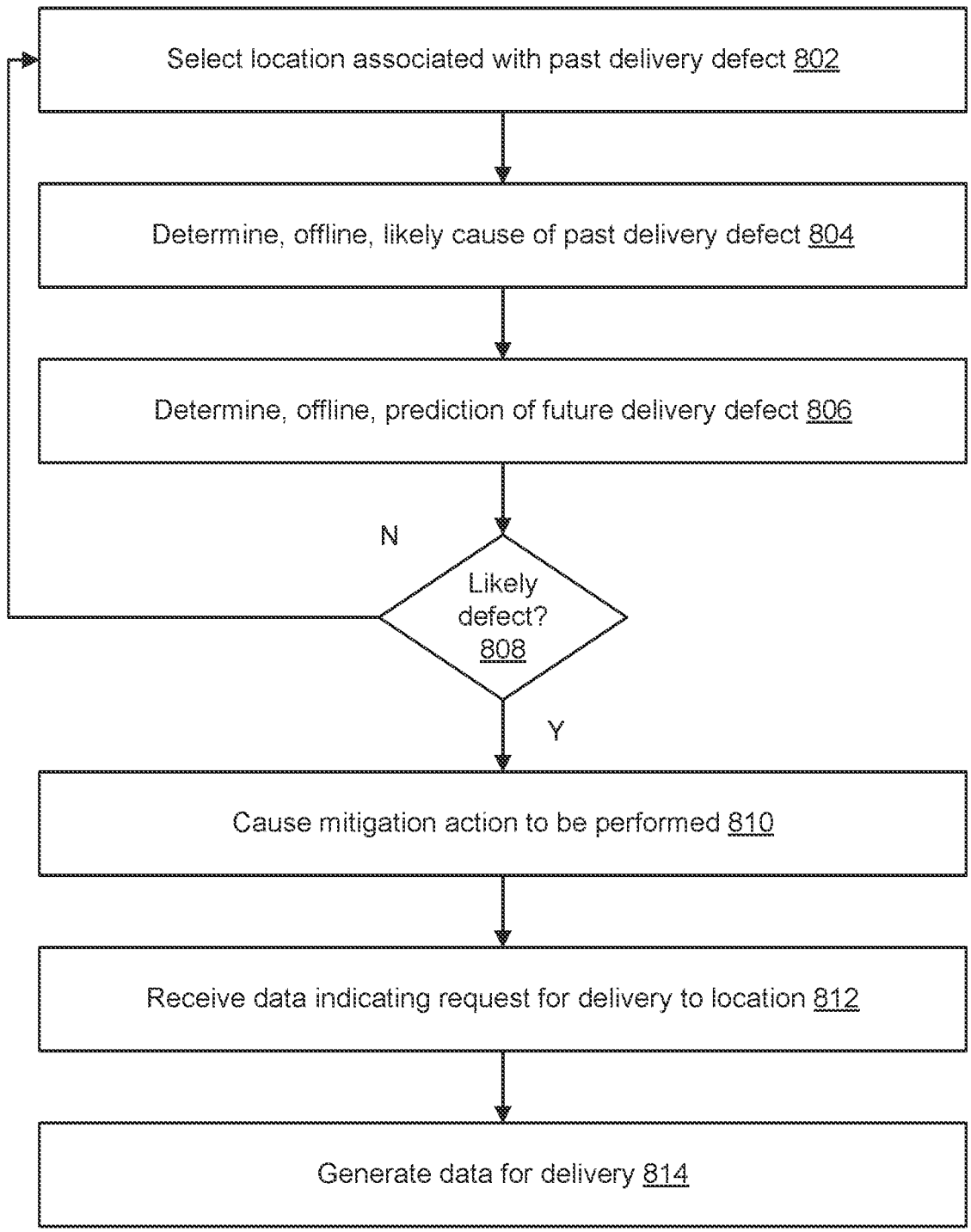
FIG. 8 illustrates an example of a flow for performing delivery defect prediction prior to a start of a delivery, according to embodiments of the present disclosure.
Figure 9:
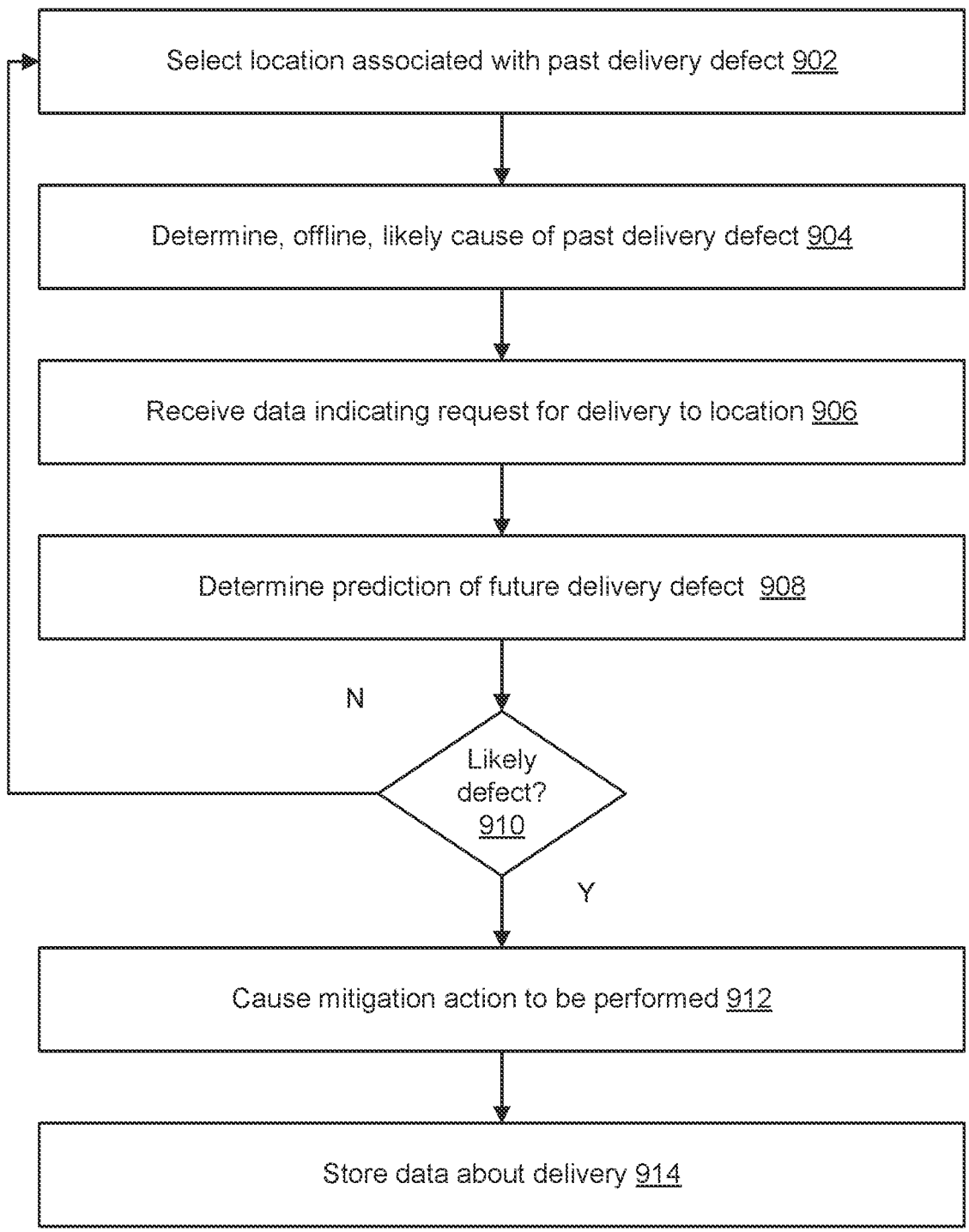
FIG. 9 illustrates an example of a flow for performing delivery defect prediction after a start of a delivery, according to embodiments of the present disclosure.

FIGS. 7-9 illustrate example flows for using a causal model and a predictive model. A computer system (e.g., the computer system 110 of FIG. 1) is described as performing the operations of the example flows. Instructions for performing the operations can be stored as computer-readable instructions on a non-transitory computer-readable medium of the computer system. As stored, the instructions represent programmable modules that include code executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is required.

FIG. 7 illustrates an example of a flow for performing delivery defect prediction, according to embodiments of the present disclosure. As illustrated, the flow may include operation 702, where the computer system determines that a past delivery to a location is associated with a past delivery defect. For instance, any time a past delivery is performed, the planning data and contextual data for the past delivery are stored in a datastore in association with an identifier of the location (or, more generally, a user account). In addition, input data may be received from a device associated with the user account or associated with a transporter account to which the past delivery was assigned. This input data can indicate the occurrence and type of delivery defect. Related delivery defect data can also be stored in the datastore in association with the identifier of the location (or, more generally, the user account). The computer system can query the datastore using the identifier of the location (or user account) and/or can query the datastore to return identifiers of locations that are associated with past delivery defects.

In an example, the flow may also include operation 704, where the computer system determines geographical data associated with the location. This geographical data may be retrieved from the datastore by using a query that includes the identifier of the location. The geographical data can include a geocode of the location and an identifier of a source of the geocode, in addition to other possible data (e.g., an embedding of an address of the location).

In an example, the flow may also include operation 706, where the computer system determines area data associated with the location. This area data may also be retrieved from the datastore by using the same or a different query that includes the identifier of the location. The area data can include embeddings of a localized area and a globalized area that include the location.

In an example, the flow may also include operation 708, where the computer system generates a first input to the causal model. For instance, the first input includes the identifier of the geocode source, the embeddings of the localized and globalized areas, and other possible data (e.g., embeddings of the address, contextual data associated with the past delivery, and/or planning data associated with the past delivery).

In an example, the flow may also include operation 710, where the computer system determines a first output of the causal model. For instance, the program code of the causal model is executed, and the execution processes the first input to generate the first output. The first output indicates a prediction of a cause of the past delivery defect, as described in connection with FIG. 4.

In an example, the flow may also include operation 712, where the computer system generates a second input to the predictive model. For instance, the second input includes the first output, the geographical data, the area data, and other data (e.g., embeddings of contextual data for the past and next deliveries, embeddings of planning data for the past and next deliveries, etc.).

In an example, the flow may also include operation 714, where the computer system determines a second output of the predictive model. For instance, the program code of the predictive model is executed, and the execution processes the second input to generate the second output. The first output indicates a prediction of a future delivery defect, as described in connection with FIG. 3.

In an example, the flow may also include operation 716, where the computer system causes a mitigation action to be performed. For instance, the second output indicates the mitigation action. Alternatively, a mapping of causes-to-mitigation actions may be predefined and looked up based on the second output to determine the mitigation action. Depending on whether the second output is performed prior to a delivery or during a delivery, the mitigation action can be to update the data used for planning the next delivery or to provide instructions for completing the next delivery as described in FIGS. 1 and 2 and further herein below.

FIG. 8 illustrates an example of a flow for performing delivery defect prediction prior to a start of a delivery, according to embodiments of the present disclosure. Here, both the causal model and the predictive model are used prior to the start of the delivery, whereby the resulting mitigation action can be performed to update the data used for planning the next delivery prior to its start.

In an example, the flow may include operation 802, where the computer system selects a location associated with a past delivery defect. This operation may be similar to operation 702, whereby the computer system may query the datastore using an identifier of the location or querying for a query result that indicates locations within a region that are associated with past delivery defect. From the query result, the computer system can select the location such that to perform prediction about the possibility for a future delivery defect associated with the location and initiate a mitigation action to prevent it.

In an example, the flow may also include operation 804, where the computer system determines, offline, a likely cause of the past delivery defect. For instance, offline indicates that this determination is performed before and/or independent of a next delivery. The computer system can generate an input to and determine an output of the causal model as described in FIG. 7 as part of this determination. The output indicates the likely cause.

In an example, the flow may also include operation 806, where the computer system determines, offline, a prediction of a future delivery defect. Here also, offline indicates that this determination is performed before and/or independent of the next delivery. The computer system can generate an input to and determine an output of the predictive model as described in FIG. 7 as part of this determination. The output indicates the likely prediction of the future defect.

In an example, the flow may also include operation 808, where the computer system determines whether the prediction indicates a likelihood larger than a threshold value. If no, then no mitigation action may need to be performed and operation 802 may follow operation 808 as indicated by the loop. Otherwise, operation 810 may follow operation 808.

In an example, the flow may also include operation 810, where the computer system causes a mitigation action to be performed. As explained herein above, the mitigation action can be indicated by the output of the predictive model or can be determined based on a look-up of causes-to-mitigation actions mapping. The mitigation action can include making one or more updates to data that may be used for the next delivery, such as to change the geocode source, change a transporter profile to be used, change a user interface for the transporter, change a vehicle type to be used, require the next delivery to be performed during a certain time of day, etc. Such update(s) can be stored in the datastore and used during the planning of the next delivery. Although not illustrated in FIG. 8, a loop may exist between operation 810 and 806 until the likelihood of a future delivery defect no longer exceed the threshold value used at operation 808, such that the updates can be iteratively made in multiple loops.

In an example, the flow may also include operation 812, where the computer system receives data indicating a request for a delivery to the location. For instance, a user device associated with the user account for the location can interact with an online service to order items that are to be delivered to the location. Data associated with such an order can be received by the computer system and used to plan for the delivery.

In an example, the flow may also include operation 814, where the computer system generates data for the delivery. For instance, this data can be planning data that indicates the time window to perform the delivery, the assignment of a transporter account to the delivery, etc. and can be generated in response to the request for the delivery by using the updates stored in the datastore.

FIG. 9 illustrates an example of a flow for performing delivery defect prediction after a start of a delivery, according to embodiments of the present disclosure. Here, at least the predictive model is used after the start of the delivery, whereby the resulting mitigation action can be performed to instruct a delivery resource performing the delivery. It may be possible to also use the causal model after the start of the delivery, although FIG. 9 illustrates is pre-delivery use.

In an example, the flow may include operation 902, where the computer system selects a location associated with a past delivery defect. This operation may be similar to operation 702, whereby the computer system may query the datastore using an identifier of the location or querying for a query result that indicates locations within a region that are associated with past delivery defect. From the query result, the computer system can select the location such that to perform prediction about the possibility for a future delivery defect associated with the location and initiate a mitigation action to prevent it.

In an example, the flow may also include operation 904, where the computer system determines, offline, a likely cause of the past delivery defect. For instance, offline indicates that this determination is performed before and/or independent of a next delivery. The computer system can generate an input to and determine an output of the causal model as described in FIG. 7 as part of this determination. The output indicates the likely cause.

In an example, the flow may also include operation 906, where the computer system receives data indicating a request for a delivery to the location. For instance, a user device associated with the user account for the location can interact with an online service to order items that are to be delivered to the location. Data associated with such an order can be received by the computer system and used to plan for the delivery.

In an example, the flow may also include operation 908, where the computer system In an example, the flow may also include operation 910, where the computer system determines whether the prediction indicates a likelihood larger than a threshold value. If no, then no mitigation action may need to be performed and operation 902 may follow operation 910 as indicated by the loop. Otherwise, operation 912 may follow operation 910.

In an example, the flow may also include operation 912, where the computer system causes a mitigation action to be performed. As explained herein above, the mitigation action can be indicated by the output of the predictive model or can be determined based on a look-up of causes-to-mitigation actions mapping. The mitigation action can include sending instructions to a delivery resource (e.g., a delivery robot in case of automated deliveries, or to a delivery device for presentation thereat in case of a transporter) such that the delivery is performed at the correct location (e.g., by minimizing the distance to the correct location). Although not illustrated in FIG. 9, a loop may exist between operation 912 and 908 until the likelihood of a future delivery defect no longer exceed the threshold value used at operation 908, such that the multiple mitigation actions can be performed.

In an example, the flow may also include operation 914, where the computer system stores data about the delivery. For instance, the data may indicate the prediction(s) of the future delivery defect(s) and the mitigation action(s) that were taken. This data can be stored in the data store and used for planning a next delivery and/or for further training the predictive model.

Figure 10:
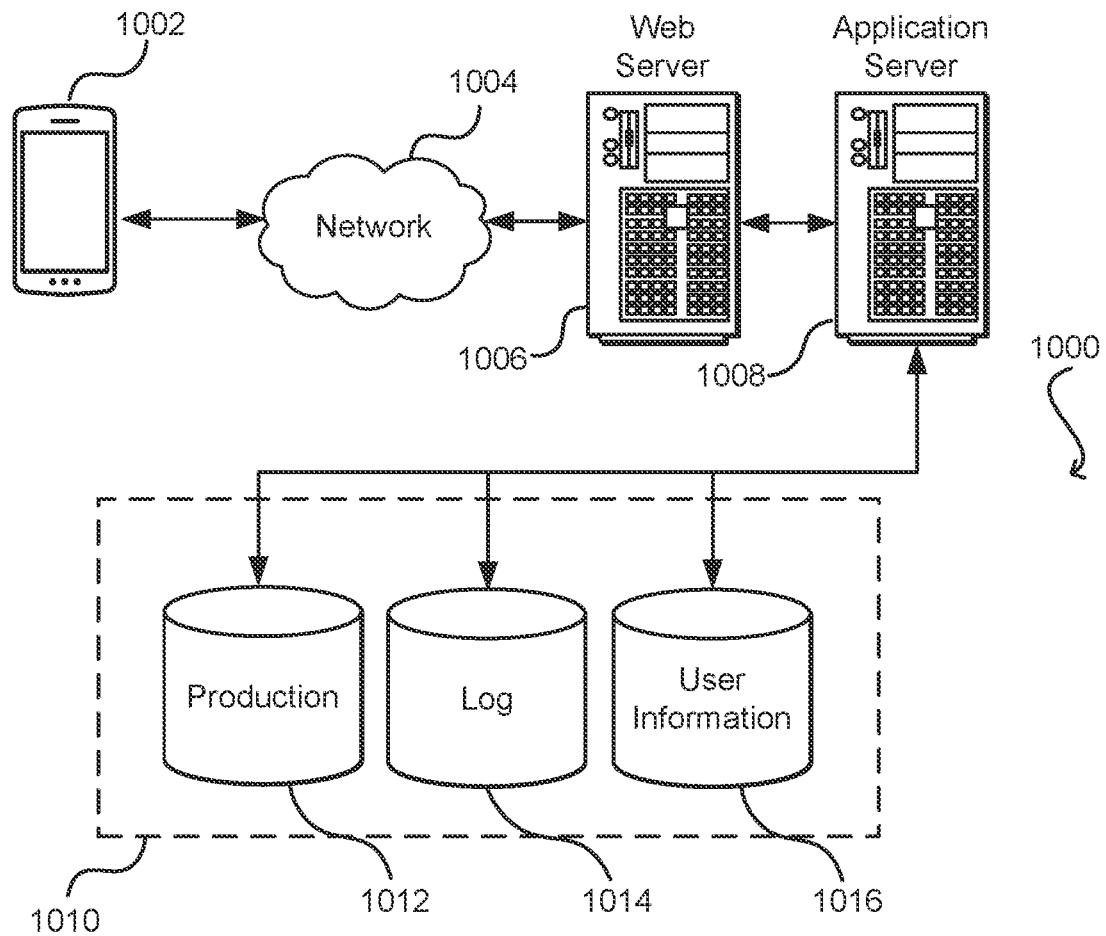
FIG. 10 illustrates an environment in which various embodiments can be implemented.

FIG. 10 illustrates an environment 1000 in which various embodiments can be implemented. As will be appreciated, although a Web-based environment is used for purposes of explanation, different environments may be used, as appropriate, to implement various embodiments. The environment includes an electronic client device 1002 (such as any of the user and transporter devices described herein above), which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system comprising:
   one or more processors; and
   one or more memory storing instructions that, upon execution by the one or more processors, configure the computer system to:
   determine, from a datastore, that a past delivery to a location is associated with a past delivery defect;
   determine, from the datastore, geographical data associated with the location, the geographical data including a distance derived from a geocode of the location and location data of a device associated with the past delivery, the geographical data further including an identifier of a source of the geocode;
   generate a first embedding of first features of a first area that includes the location;
   generate a second embedding of second features of a second area that includes the location;
   generate a first input to a causal model, the first input comprising the identifier of the source of the geocode, the first embedding, and the second embedding, the causal model trained using predefined defect causes;
   determine a first output of the causal model, the first output indicating a first likelihood of a cause of the past delivery defect, a plurality of possible causes of the past defect from the predefined defect causes, and a likelihood distribution of the possible causes;
   generate a second input to a predictive model, the second input comprising the geographical data, the first embedding, the second embedding, and the first likelihood;
   determine a second output of the predictive model based at least in part on the second input, the second output indicating a second likelihood of a future delivery defect, a plurality of possible future defects, and a likelihood distribution of the possible defects;
   store, in the datastore, the second likelihood; and
   cause, prior to a start of a delivery to the location, a mitigation action to be performed such that the future delivery defect is prevented.

2. The computer system of claim 1, wherein the one or more memory store further instructions that, upon execution by the one or more processors, configure the computer system to:
   determine, based at least in part on the first output and the second output, that a likely cause of the future delivery defect is associated with the source of the geocode;
   determine an alternate geocode for the location based at least in part on the likely cause;
   associate the alternate geocode with the delivery, wherein the mitigation action includes using the alternate geocode for the delivery.

3. The computer system of claim 1, wherein the one or more memory store further instructions that, upon execution by the one or more processors, configure the computer system to:
   store, in the datastore, an association between the mitigation action and a predefined defect cause of the predefined defect causes;
   determine, based at least in part on the second output, a likely cause of the future delivery defect, wherein the second output indicates the likely cause; and
   determine the mitigation action based at least in part on a correspondence between the likely cause and the predefined defect cause and the association between the mitigation action and the predefined defect cause.

4. The computer system of claim 1, wherein each one of the causal model and the predictive model are trained based at least in part on training data indicating geocode sources, area data, delivery not received defects, delivery to incorrect location defects, incomplete delivery due to unlocated location defects, and incomplete delivery due to inaccessible location defects.

5. A computer-implemented method comprising:
  determining that a past service to a location is associated with a past defect;
  generating a first embedding of first features of a first area that includes the location;
  generating a second embedding of second features of a second area that includes the location;
  generating a first input to a causal model based at least in part on geographical data associated with the location, the first embedding, and the second embedding;
  determining a first output of the causal model based at least in part on the first input, the first output indicating a first likelihood of a cause of the past defect, a plurality of possible causes of the past defect from a predefined set of possible causes, and a likelihood distribution of the possible causes;
  generating a second input to a predictive model based at least in part on the first input and the first output;
  determining a second output of the predictive model based at least in part on the second input, the second output indicating a second likelihood of a future defect, a plurality of possible future defects, and a likelihood distribution of the possible future defects; and
  causing, based at least in part on the second likelihood, a mitigation action to be performed such that the future defect is prevented.

6. The computer-implemented method of claim 5, further comprising:
  determining, based at least in part on the geographical data, an identifier of a source of a geocode of the location; and
  including the identifier in the first input.

7. The computer-implemented method of claim 6, further comprising:
  determining, from the geographical data, a distance derived from the geocode of the location and location data of a device associated with the past service; and
  generating, by the causal model, an association between the first input and the distance, wherein the first output is generated based at least in part on the first input, the distance, and the association.

8. The computer-implemented method of claim 5, further comprising:
  receiving data from a user device indicating a request for a delivery to the location, wherein the first output and the second output are determined prior to the data being received, and wherein the mitigation action is performed prior to a start of the delivery.

9. The computer-implemented method of claim 5, further comprising:
  receiving first data from a first user device indicating a request for a delivery to the location; and
  receiving second data from a second user device indicating a start of the delivery, wherein the second output is determined after the start of the delivery, and wherein the mitigation action is performed prior to a completion of the delivery.

10. The computer-implemented method of claim 5, further comprising:
  receiving first data from a user device indicating a request for a delivery to the location; and
  determining second data about the delivery, wherein the second input is generated further based at least in part on the second data, and wherein the first input is generated independently of the second data.

11. The computer-implemented method of claim 5, further comprising:
  receiving data from a user device indicating a request for a future service to the location or to a different location, wherein the second output is generated prior to or after the data is received, and wherein the future defect is associated with the future service.

12. The computer-implemented method of claim 5, wherein the past service and the past defect are a first past delivery and a first past delivery defect, respectively, and wherein the computer-implemented method further comprises:
  determining that a second past delivery to the location is associated with a second past delivery defect; and
  including, in the first input, data about the second past delivery defect.

13. One or more non-transitory computer-readable storage media storing instructions that, upon execution on a system, cause the system to perform operations comprising:
  determining that a past service to a location is associated with a past defect;
  generating a first embedding of first features of a first area that includes the location;
  generating a second embedding of second features of a second area that includes the location;
  generating a first input to a causal model based at least in part on geographical data associated with the location the first embedding, and the second embedding;
  determining a first output of the causal model based at least in part on the first input, the first output indicating a first likelihood of a cause of the past defect, a plurality of possible causes of the past defect from a predefined set of possible causes, and a likelihood distribution of the possible cause;
  generating a second input to a predictive model based at least in part on the first input and the first output;
  determining a second output of the predictive model based at least in part on the second input, the second output indicating a second likelihood of a future defect, a plurality of possible future defects, and a likelihood distribution of the possible future defects; and
  causing, based at least in part on the second output, a mitigation action to be performed such that the future defect is prevented.

14. The one or more non-transitory computer-readable storage media of claim 13 storing further instructions that, upon execution on the system, cause the system to perform further operations comprising:
  generating an embedding based at least in part on features of the one or more areas; and
  including the embedding in the first input and the second input.

15. The one or more non-transitory computer-readable storage media of claim 13 storing further instructions that, upon execution on the system, cause the system to perform further operations comprising:
  determining, based at least in part on the geographical data, a distance derived from a geocode of the location and location data of a device associated with the past service;
  determining, based at least in part on the geographical data, an identifier of a source of the geocode; and
  including the identifier of the geocode and the distance in the second input.

16. The one or more non-transitory computer-readable storage media of claim 13 storing further instructions that, upon execution on the system, cause the system to perform further operations comprising:
determining defect data about the past defect; and
including the defect data and the first likelihood in the second input.

17. The one or more non-transitory computer-readable storage media of claim 13 storing further instructions that, upon execution on the system, cause the system to perform further operations comprising:
generating a first embedding of first features of a first area that includes the location;
generating a second embedding of second features of a second area that includes the location; and
including the first embedding and the second embedding in the second input.

18. The one or more non-transitory computer-readable storage media of claim 13 storing further instructions that, upon execution on the system, cause the system to perform further operations comprising:
determining at least one of: account data about an account associated with the past delivery, location data associated with an address of the location, or user data about a user account associated with the location; and
including, in the second input, the at least one of the account data, the location data, or the user data.

19. The one or more non-transitory computer-readable storage media of claim 13 storing further instructions that, upon execution on the system, cause the system to perform further operations comprising:
determining data about a future service to the location or to a different location; and
including the data in the second input, wherein the second likelihood indicates at least one of a likelihood of the future defect associated with the future service or a type of the future defect.

20. The one or more non-transitory computer-readable storage media of claim 13 storing further instructions that, upon execution on the system, cause the system to perform further operations comprising:
determining, based at least in part on the second output, a likely cause of the future defect, wherein the second output indicates the likely cause.

* * * * *